United States Patent

Casia et al.

(10) Patent No.: US 11,442,470 B2
(45) Date of Patent: Sep. 13, 2022

(54) METHOD OF AND SYSTEM FOR DISPLAYING AN AIRCRAFT CONTROL INPUT

(71) Applicant: BOMBARDIER INC., Dorval (CA)

(72) Inventors: Laurence Casia, Kirkland (CA); Mathieu St-Cyr, Dollard-des-Ormeaux (CA); Gervais Arel, Lachine (CA)

(73) Assignee: BOMBARDIER INC., Dorval (CA)

( * ) Notice: Subject to any disclaimer, the term of this patent is extended or adjusted under 35 U.S.C. 154(b) by 888 days.

(21) Appl. No.: 16/185,612

(22) Filed: Nov. 9, 2018

(65) Prior Publication Data

US 2019/0094041 A1 Mar. 28, 2019

Related U.S. Application Data

(63) Continuation of application No. PCT/IB2017/052736, filed on May 10, 2017.
(Continued)

(51) Int. Cl.
*B64C 13/18* (2006.01)
*G05D 1/10* (2006.01)
(Continued)

(52) U.S. Cl.
CPC ........... *G05D 1/101* (2013.01); *B64C 13/503* (2013.01); *B64D 43/00* (2013.01); *B64D 45/00* (2013.01);
(Continued)

(58) Field of Classification Search
CPC ...... G05D 1/101; B64C 13/503; B64C 13/04; B64C 13/18; B64D 43/00; B64D 45/00; B64D 45/0005; G02B 27/01
See application file for complete search history.

(56) References Cited

U.S. PATENT DOCUMENTS 4,663,627 A 5/1987 Dennis
6,028,536 A 2/2000 Voulgaris
(Continued)

FOREIGN PATENT DOCUMENTS

CN 102975854 A 3/2013
CN 103649863 A 3/2014
(Continued)

OTHER PUBLICATIONS

International Search Report and Written Opinion with regard to PCT/IB2017/052736 dated Aug. 7, 2017.
(Continued)

*Primary Examiner* — Masud Ahmed (74) *Attorney, Agent, or Firm* — BCF LLP (57) ABSTRACT

A method of and a system for displaying an aircraft control input. The method comprises accessing a first indication indicative of an aircraft control input, the aircraft control input being associated with an orientation and an amplitude of the aircraft control input; generating, by a processing unit, a first single visual indication based on the first indication, the first single visual indication being reflective of the orientation and the amplitude of the aircraft control input; and causing the display of the first single visual indication on a display surface, the display of the first single visual indication providing a user viewing the first single visual indication with an understanding of the orientation and the amplitude of the aircraft control input.

28 Claims, 5 Drawing Sheets

Related U.S. Application Data (60) Provisional application No. 62/334,629, filed on May 11, 2016.

(51) Int. Cl.
| | |
|---|---|
| *B64D 45/00* | (2006.01) |
| *B64C 13/50* | (2006.01) |
| *B64D 43/00* | (2006.01) |
| *G01C 23/00* | (2006.01) |
| *G02B 27/01* | (2006.01) |
| *B64C 13/04* | (2006.01) |

(52) U.S. Cl.
CPC ....... *B64D 45/0005* (2013.01); *G01C 23/005* (2013.01); *G02B 27/01* (2013.01); *B64C 13/04* (2013.01); *B64C 13/18* (2013.01)

(56) References Cited

U.S. PATENT DOCUMENTS

| | | | |
|---|---|---|---|
| 6,459,228 B1 | 10/2002 | Szulyk et al. | |
| 7,256,710 B2 | 8/2007 | Mumaw et al. | |
| 8,090,483 B2 | 1/2012 | Pepitone et al. | |
| 8,386,093 B2 | 2/2013 | Lin et al. | |
| 8,903,572 B1 * | 12/2014 | Hagelin | B64D 45/00 701/16 |
| 8,976,043 B2 | 3/2015 | Voros | |
| 2007/0235594 A1 | 10/2007 | Wingett et al. | |
| 2008/0156939 A1 | 7/2008 | Hanlon et al. | |
| 2011/0284696 A1 | 11/2011 | Stiefenhofer et al. | |
| 2013/0060466 A1 | 3/2013 | Gurusamy et al. | |
| 2015/0175274 A1 | 6/2015 | Voros | |
| 2015/0197329 A1 * | 7/2015 | Fong | B64D 43/00 701/11 |
| 2015/0262545 A1 * | 9/2015 | Kneuper | G09G 5/14 345/4 |
| 2016/0103579 A1 * | 4/2016 | Coulmeau | G08G 5/0047 701/533 |
| 2016/0179327 A1 * | 6/2016 | Zammit-Mangion | G08G 5/0039 701/7 |
| 2016/0200421 A1 * | 7/2016 | Morrison | G05D 1/0077 244/17.23 |
| 2017/0021939 A1 | 1/2017 | Crosta et al. | |

FOREIGN PATENT DOCUMENTS

| | | |
|---|---|---|
| CN | 103744289 A | 4/2014 |
| CN | 104461278 A | 3/2015 |
| CN | 104925267 A | 9/2015 |
| EP | 2568256 A2 | 3/2013 |
| EP | 2589538 A1 | 5/2013 |
| EP | 2772816 A1 | 9/2014 |
| WO | 2013/009303 A1 | 1/2013 |
| WO | 2014/081337 A1 | 5/2014 |

OTHER PUBLICATIONS

Smart Cockpit.com_Flight Controls_Airbus A319-320-321, pdf document (110 pages) retrieved on Feb. 25, 2016.

Oaviao.com, Airbus, FBW evolutions, pdf document (11 pages) retrieved on Feb. 25, 2016.

BAE Systems_Cue the Feedback, http://www.baesystems.com/en/feature/an-active-role; pdf document (7 pages) retrieved on Nov. 9, 2018.

Active Sidesticks: A New Way to Fly, https://web.archive.org/web/20160402180107/http://airwaysnews.com/blog/2015/03/23/active-sidesticks-a-new-way-to-fly/; pdf document (6 pages) retrieved on Nov. 9, 2018.

McClellan, Aviation Technology, Intelligence by Wire, vol. 05, ed. 01, 2015, http://www.nonstopbygulfstream.com/article/intelligence-by-wire; pdf document (6 pages) retrieved on Nov. 9, 2018.

English Abstract for CN103649863 retrieved on Espacenet on Mar. 17, 2022.

English Abstract for CN103744289 retrieved on Espacenet on Mar. 17, 2022.

English Abstract for CN104925267 retrieved on Espacenet on Mar. 17, 2022.

English Abstract for CN104461278 retrieved on Espacenet on Mar. 17, 2022.

English Abstract for CN102975854 retrieved on Espacenet on Mar. 17, 2022.

Office Action with regard to the counterpart CN Patent Application No. 201780028471.5 dated Jul. 26, 2021.

\* cited by examiner

```
┌─────────────────────────────────────────────────────────────┐
│  IN RESPONSE TO AN AIRCRAFT CONTROL INPUT BEING INPUTTED VIA AN │
│  AIRCRAFT CONTROLLER, RECEIVING A RAW SIGNAL FROM THE       │
│                   AIRCRAFT CONTROLLER                       │
│                            502                              │
└─────────────────────────────────────────────────────────────┘
                              ↓
┌─────────────────────────────────────────────────────────────┐
│   CONVERT THE RAW SIGNAL FROM THE AIRCRAFT CONTROLLER INTO  │
│  NUMERICAL VALUES, THE NUMERICAL VALUES BEING REFLECTIVE OF │
│  AN ORIENTATION AND AN AMPLITUDE OF THE AIRCRAFT CONTROL INPUT │
│                            504                              │
└─────────────────────────────────────────────────────────────┘
                              ↓
┌─────────────────────────────────────────────────────────────┐
│        GENERATE A FIRST SINGLE VISUAL INDICATION BASED      │
│                   ON THE NUMERICAL VALUES                   │
│                            506                              │
└─────────────────────────────────────────────────────────────┘
                              ↓
┌─────────────────────────────────────────────────────────────┐
│   CAUSE THE DISPLAY OF THE FIRST SINGLE VISUAL INDICATION   │
│   ON A DISPLAY SURFACE, THE DISPLAY OF THE FIRST SINGLE     │
│  VISUAL INDICATION PROVIDING A USER VIEWING THE FIRST SINGLE │
│  VISUAL INDICATION WITH AN UNDERSTANDING OF THE ORIENTATION │
│       AND THE AMPLITUDE OF THE AIRCRAFT CONTROL INPUT       │
│                            508                              │
└─────────────────────────────────────────────────────────────┘
```

Fig.5

METHOD OF AND SYSTEM FOR DISPLAYING AN AIRCRAFT CONTROL INPUT

CROSS-REFERENCE

This application is a continuation of International Application No. PCT/IB2017/052736, filed May 10, 2017, which claims priority from U.S. Provisional Patent Application No. 62/334,629, filed May 11, 2016, each of which is incorporated herein by reference in its entirety.

FIELD

The present technology relates to systems and methods for displaying an aircraft control input. In particular, the systems and methods comprise accessing an aircraft control input associated with an orientation and an amplitude to generate a visual indication to be displayed to a user such as, but not limited to, a pilot or a co-pilot.

BACKGROUND

In traditional aircraft, mechanical and/or hydraulic flight control systems are relied upon to control the aircraft. Such mechanical and/or hydraulic flight control systems typically rely on aircraft controllers, such as yokes, mechanically and/or hydraulically connected to flight control surfaces of the aircraft to allow a pilot and a co-pilot to control the aircraft. Such mechanical and/or hydraulic flight control systems are mechanically coupled together so that a first input on a first aircraft controller associated with a pilot is replicated on a second aircraft controller associated with a co-pilot and vice-versa. In some instances, the first input is a physical displacement of the first aircraft controller. In some instances, the first aircraft controller is a first yoke and the second aircraft controller is a second yoke. Under such configuration, mechanically coupling the first aircraft controller and the second aircraft controller provides direct and natural feedback between the pilot and the co-pilot so that they can each "feel" and/or "observe" a control command that the other one is inputting to the control system(s).

Over the last decades, some aircraft OEMs have transitioned from mechanical and/or hydraulic flight control systems to fly-by-wire flight control systems. Broadly speaking, a fly-by-wire flight control system is a system that replaces at least a part of the conventional mechanical flight control components of an aircraft with electronic and/or electric components. In a fly-by-wire flight control system, movements of the aircraft controllers are converted to electronic signals transmitted by wires to one or more flight control computers that, in turn, determine how to move actuators associated with flight control surfaces thereby providing an ordered response. Under some approaches, a fly-by-wire flight control system also allows automatic signals sent by the aircraft's computers to perform functions without the pilot's or the co-pilot's input, so as to automatically help stabilize the aircraft and/or prevent unsafe operation of the aircraft outside of a performance envelope. In most instances, aircraft controllers associated with fly-by-wire flight control systems are not coupled meaning that a first input on a first aircraft controller associated with a pilot is not replicated on a second aircraft controller associated with a co-pilot and vice-versa. In some instances, the first input is a physical displacement of the first aircraft controller. In some instances, the first aircraft controller is a first side stick and the second aircraft controller is a second side stick.

Uncoupled aircraft controllers operating fly-by-wire flight control systems may result in a pilot and a co-pilot being unaware of each other's input, through lack of tactile and/or visual feedback, for example. This deficiency may result in situations wherein the pilot and/or the co-pilot input divergent inputs or be unable to suggest or implement a corrective input. Under some specific circumstances, such unawareness between the pilot and the co-pilot may result in misplaced commands to the flight control computers which may contribute to a loss of control of the aircraft and/or unsafe situations.

To address this situation, various approaches have been proposed such as the one depicted in U.S. Pat. No. 8,976,043 to Textron Innovation (the '043 patent). The '043 patent describes a system and method for illuminating one or more side stick controllers within a cockpit of an aircraft. In some embodiments, the system includes a side stick controller having lighting components that display lighting behaviors representing the movement and/or control of an aircraft. The system illuminates various lighting components on a side stick controller based on information received from aircraft control systems, cockpit lighting systems and other systems associated with an aircraft.

Even though the '043 patent illustrates an approach to address the situation set forth above, improvements are still desirable, in particular improvements aiming at, but not limited to, limiting a cognitive effort required by a pilot and/or a co-pilot to visualize and/or understand each other's inputs made via the aircraft controllers.

SUMMARY

The present technology arises from an observation made by the inventor(s) that an indication indicative of an aircraft control input associated with an orientation (which could also be equally referred to as a direction) and an amplitude of the aircraft control input may be relied upon to generate a single visual indication reflective of the orientation and the amplitude of the aircraft control input. In some embodiments, the single visual indication may be displayed on a display surface.

Thus, in one aspect, various implementations of the present technology provide computer-implemented method for displaying an aircraft control input, the method comprising:
  accessing, from a non-transitory computer-readable medium, a first indication indicative of an aircraft control input, the aircraft control input being associated with an orientation and an amplitude of the aircraft control input;
  generating, by a processing unit, a first single visual indication based on the first indication, the first single visual indication being reflective of the orientation and the amplitude of the aircraft control input; and
  causing the display of the first single visual indication on a display surface, the display of the first single visual indication providing a user viewing the first single visual indication with an understanding of the orientation and the amplitude of the aircraft control input.

In another aspect, causing the first single visual indication to be displayed comprises causing the first single visual indication to be displayed in relation to at least one of a graphical amplitude scale and a graphical orientation scale.

In yet another aspect, the first single visual indication comprises a dot and the display surface further displays a target-like graphical component, the target-like graphical component comprising circular graphical patterns easing the understanding of the orientation and the amplitude.

In another aspect, the orientation is associated with (1) a first axis of the display surface and (2) a second axis of the display surface and the amplitude is associated with (3) a first distance of the first single visual indication to the first axis and (4) a second distance of the first single visual indication to the second axis.

In yet another aspect, a first quantitative value is associated with the first axis of the display surface and a second quantitative value is associated with the second axis, the first quantitative value being reflective of a first axis amplitude of the aircraft control input along a longitudinal axis and the second quantitative value being reflective of a second axis amplitude of the aircraft control input along a vertical axis.

In another aspect, the first quantitative value and the second quantitative value reflect values of the aircraft control input provided to a fly-by-wire system.

In yet another aspect, the first quantitative value and the second quantitative value are one of absolute values and relative values.

In another aspect, the first distance is proportional to the first quantitative value and the second distance is proportional to the second quantitative value.

In yet another aspect, the aircraft control input is generated by an aircraft controller.

In another aspect, the aircraft controller is one of a side stick, a yoke, a rudder pedal and an autopilot.

In yet another aspect, the first indication indicative of the aircraft control input is a numerical value generated based on a raw digital signal of the aircraft controller.

In another aspect, the display surface is at least a part of a multi-function display, a primary flight display and a head-up display.

In yet another aspect, causing the display of the first single visual indication on the display surface is in response to an event relating to the operation of an aircraft.

In another aspect, causing the display of the first single visual indication on the display surface is in response to the event relating to the operation of an aircraft comprises temporarily displaying the first single visual indication on the display surface.

In yet another aspect, the event comprises at least one of a detection of a change in flight mode, a dual input received from a first aircraft controller and a second aircraft controller and a detection of a flight envelope limit.

In another aspect, various implementations of the present technology provide computer-implemented method for displaying an aircraft control input, the method comprising:
  in response to an aircraft control input being inputted via an aircraft controller, receiving a raw signal from the aircraft controller;
  converting, by a processing unit, the raw signal from the aircraft controller into numerical values, the numerical values being reflective of an orientation and an amplitude of the aircraft control input;
  generating, by the processing unit, a first single visual indication based on the numerical values; and
  causing the display of the first single visual indication on a display surface, the display of the first single visual indication providing a user viewing the first single visual indication with an understanding of the orientation and the amplitude of the aircraft control input.

In other aspects, various implementations of the present technology provide a non-transitory computer-readable medium storing program instructions for displaying an aircraft control input, the program instructions being executable by a processor of a computer-based system to carry out one or more of the above-recited methods.

In other aspects, various implementations of the present technology provide a computer-based system, such as, for example, but without being limitative, a flight computer comprising at least one processor and a memory storing program instructions for displaying an aircraft control input, the program instructions being executable by the at least one processor of the flight computer to carry out one or more of the above-recited methods.

In the context of the present specification, unless expressly provided otherwise, a computer system may refer, but is not limited to, an "electronic device", a "controller", an "flight control computer", "a flight control system", a "flight computer", an "avionic computer", an "Engine-Indicating and Crew-Alerting System (EICAS)", a "server", a, "remote server", a "computer-based system" and/or any combination thereof appropriate to the relevant task at hand. Thus, some non-limiting examples of hardware and/or software include computers (flight computer, digital computer, etc.), aircraft equipment (controller, display screen, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a data could include the data itself (i.e. its contents), or it could be a unique data descriptor identifying a file with respect to a particular file system, or some other means of directing the recipient of the indication to a network location, memory address, database table, signal (whether analogic or numeric) or other location where the file may be accessed. As one skilled in the art would recognize, the degree of precision required in such an indication depends on the extent of any prior understanding about the interpretation to be given to data being exchanged as between the sender and the recipient of the indication. For example, if it is understood prior to a communication between a sender and a recipient that an indication of data element will take the form of a database key for an entry in a particular table of a predetermined database containing the data element, then the sending of the database key is all that is required to effectively convey the data element to the recipient, even though the data element itself was not transmitted as between the sender and the recipient of the indication.

In the context of the present specification, unless expressly provided otherwise, a "single visual indication" may refer to a graphical icon and/or other forms of visual indicators which may or may not include alpha/numeric textual information. The single visual indication may also broadly refer to a graphical element which may or may not be an icon and which is designed so as to visually indicate both an orientation and an amplitude of the aircraft control input as a single graphical component. The single visual indication is designed in a way which aims at reducing a cognitive effort required by a user (e.g., a pilot and/or a co-pilot) to interpret the orientation and the amplitude of the aircraft control input aircraft system. The user may typically be, but not limited to, one or more cabin crew members such as a pilot and/or a co-pilot. The single visual indication may be presented to the user through a wide variety of supports such as a display screen or a projection device (either worn by the user or directly mounted on the aircraft) which may be broadly referred to as a display surface. Multiple variations regarding how the single visual indication is designed and how the single visual indication is presented to the user may be envisioned without departing from the scope of the present technology and will become apparent to the person skilled in the art.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first indication" and "second indication" is not intended to imply any particular order, type, chronology, hierarchy or ranking (for example) of/between the indications, nor is their use (by itself) intended to imply that any "third indication" must necessarily exist in any given situation. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", a "controller" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Figure 1:
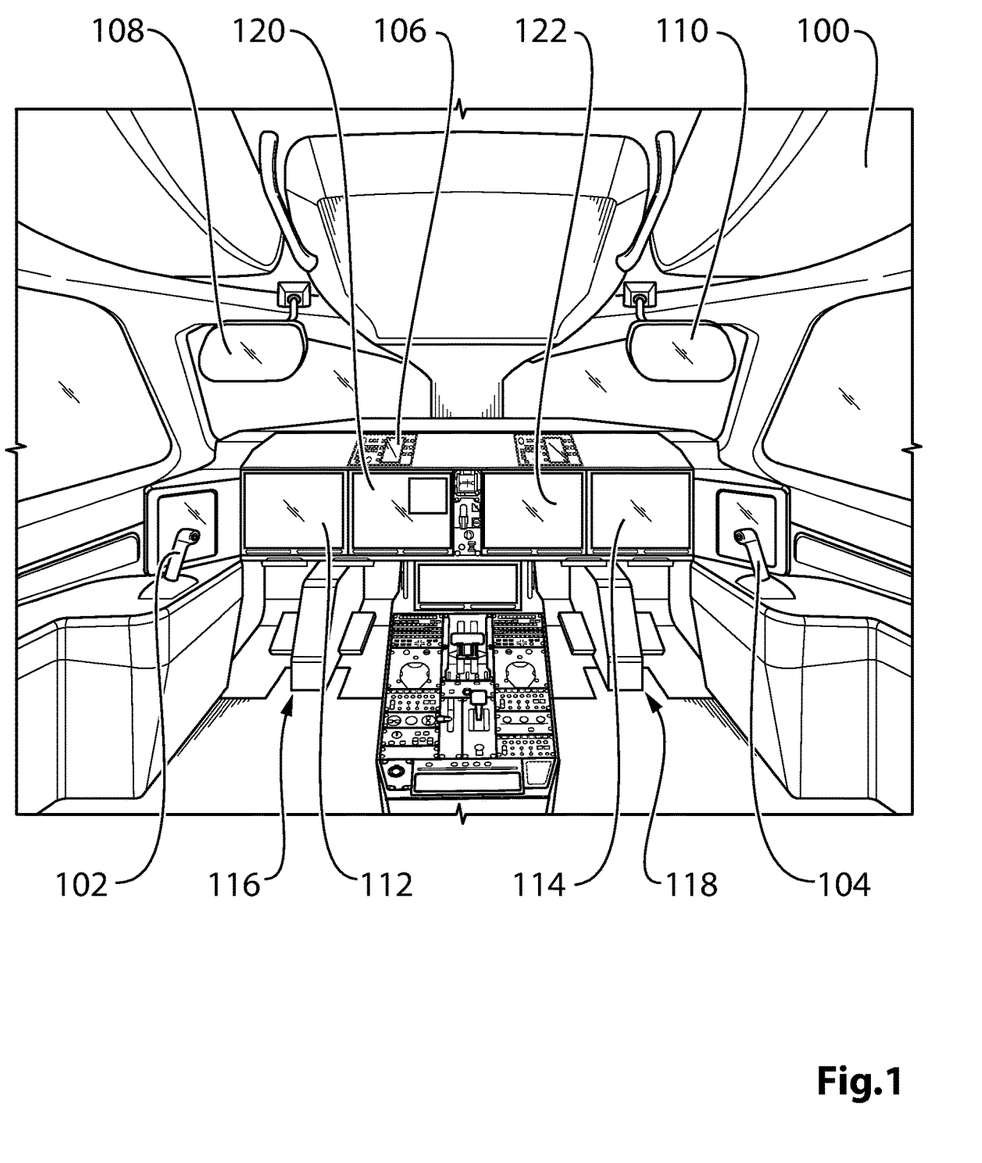
FIG. 1 is a front elevation view of an exemplary aircraft cockpit.

Referring to FIG. 1, there is shown an aircraft cockpit 100 for use with some implementations of the present technology. The aircraft cockpit 100 comprises various human-machine interfaces allowing one or more crew members to interact with and/or control various systems of an aircraft. In some embodiments, the aircraft cockpit 100 may equally be referred to as an aircraft flight deck. In the illustrated embodiment, the aircraft cockpit 100 comprises multiple aircraft controllers which crew members, such as a pilot and a co-pilot, may use to input aircraft control inputs. In some embodiments, the aircraft control inputs, also referred to as aircraft control commands or commands, are inputted by the pilot or the co-pilot via a physical displacement of one or more of the aircraft controllers. In some embodiments, each control input may be associated with an orientation (also referred to as a direction) and an amplitude. Typically, when the aircraft is in flight, the orientation allows the pilot or co-pilot to control one or more of a pitch, roll and/or yaw of the aircraft and the amplitude allows the pilot or co-pilot to control an intensity of a modification of the pitch, roll and/or yaw of the aircraft. In some embodiments, the intensity may be associated with angle variations of the pitch, roll and/or yaw of the aircraft. In some embodiments, the one or more aircraft controllers translate a physical displacement into analogic or digital signals which may then be transmitted to aircraft systems such as, but not limited to, a flight computer (such as the flight computer 201 illustrated a FIG. 2). In some embodiments, the aircraft controllers may comprise one or more of a first side stick 102, a second side stick 104, a first set of rudder pedals 116 and a second set of rudder pedals 118.

Even though the first side stick 102 and the second side stick 104 implemented in the form of a joystick are illustrated in FIG. 1, other variations of aircraft controllers may equally be envisioned such as aircraft control columns implemented in the form of a yoke. In some instances, the first side stick 102 and the second side stick 104 are located on side consoles of the aircraft cockpit 100 so as to be handled by either a right hand or a left hand of the pilot or the co-pilot. Other locations may also be envisioned, in particular when the aircraft controller is implemented via a yoke, such as, but not limited to, in a space located between the legs of the pilot and co-pilot when they are sitting in their respective seats. Other variations as to how the first aircraft controller 102 and the second aircraft controller 104 may be implemented and where they may be located in the aircraft cockpit 100 may be envisioned without departing from the scope of the present technology and will become apparent to the person skilled in the art of the present technology.

In the embodiment illustrated in FIG. 1, the first set of pedals 116 and the second set of pedals 118 are positioned in a space beneath the various displays so as to be controllable by the feet of the pilot and the co-pilot when they are sitting in their respective seats. In some embodiments, the first set of pedals 116 and the second set of pedals 118 are mechanically and/or hydraulically connected to one or more rudders of the aircraft. In some embodiments, the first set of pedals 116 and the second set of pedals 118 are part of a fly-by-wire system and, as such, are electronically connected to a flight computer. Other variations as to how the first set of pedals 116 and the second set of pedals 118 are implemented may be envisioned and will become apparent to the person skilled in the art of the present technology.

In the embodiment illustrated in FIG. 1, the aircraft cockpit 100 also comprises a glare shield 106 and display surfaces. The glare shield 106 may comprise various control and interface elements such as control buttons (not shown) allowing the pilot and/or the co-pilot to define which one of the first side stick 102 and the second side stick 104 has priority. Such control buttons may allow one of the pilot and the co-pilot to ensure that only her/his control inputs are taken into consideration irrespectively of control inputs made by the other one of the pilot and the co-pilot.

The display surfaces may comprise a first head-up display 108, a second head-up display 110, a first primary flight display 112, a second primary flight display 114, a first EICAS display 120 and a second EICAS display 122. In some embodiments, the first head-up display 108 and the second head-up display 110 are implemented via a see-through surface (e.g., glass) allowing projections of images on display surfaces while allowing the pilot and/or co-pilot to remain aware of certain parameters relating to the operation of the aircraft without modifying her/his normal line of sight. In some embodiments, the first head-up display 108, the second head-up display 110, the first primary flight display 112 and the second primary flight display 114 present parameters relating to the operation of the aircraft and/or navigational information. In some embodiments, the EICAS display 120 and the second EICAS display 122 may present information relating to operations of one or more engines and other systems of the aircraft. As the reader will appreciate, the first head-up display 108, the second head-up display 110, the first primary flight display 112, the second primary flight display 114, the first EICAS display 120 and the second EICAS display 122 are examples of display surfaces on which a single visual indication generated in accordance with the present technology may be displayed. Other variations may be envisioned, whether via display systems attached to the aircraft cockpit 100 or display systems which may be brought into the aircraft cockpit 100 (such as a tablet, a phablet, a phone, etc) or even worn by the pilot and/or co-pilot such, but not limited to, an augmented reality helmet, augmented reality glasses, augmented reality lenses, etc. Other variations as to how a display surface may be implemented may be envisioned and will become apparent to the person skilled in the art of the present technology.

Figure 2:
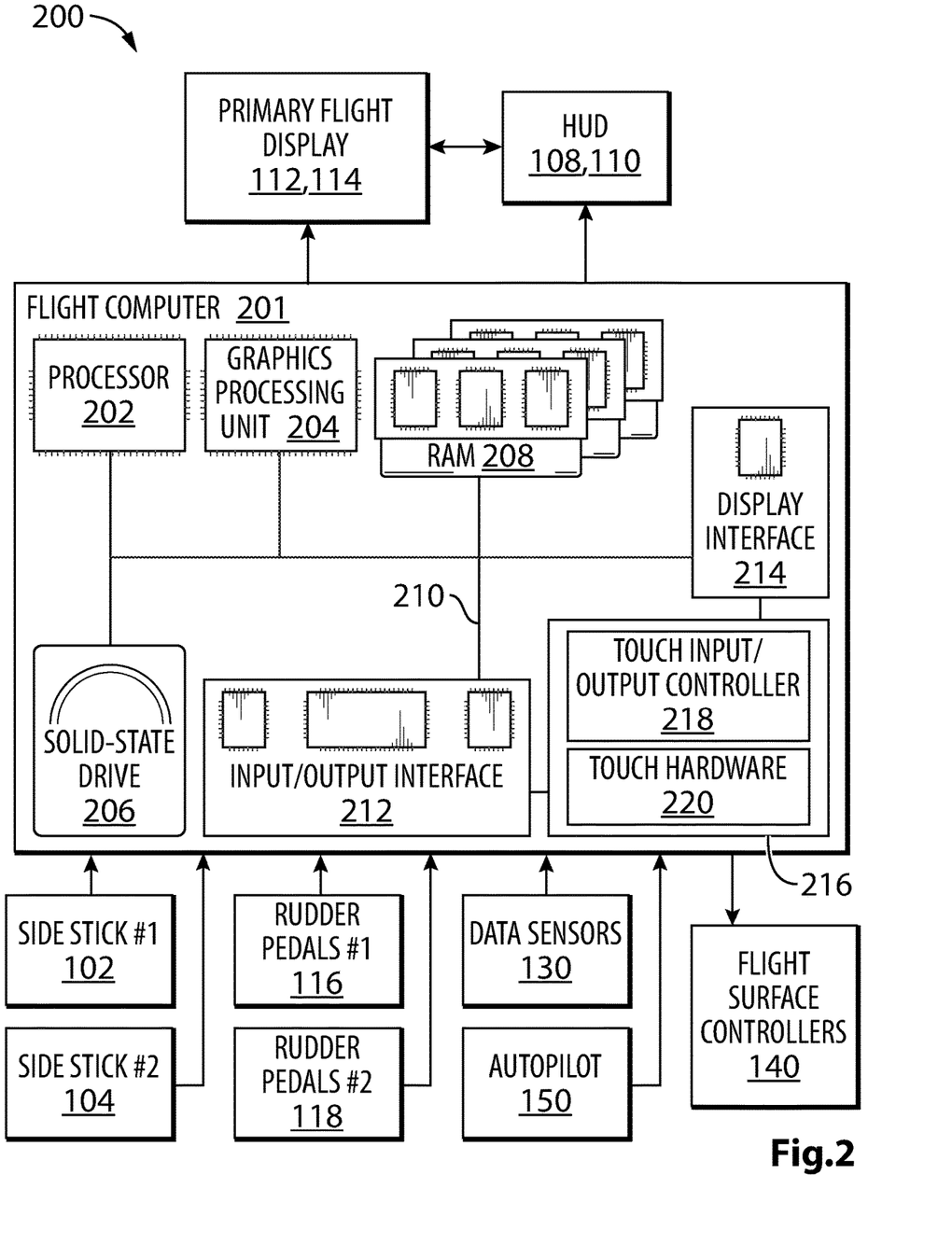
FIG. 2 is a diagram of a networked computing environment in accordance with an embodiment of the present technology.

Referring to FIG. 2, there is shown an aircraft computer environment 200 suitable for use with some implementations of the present technology. In the illustrated embodiment, the aircraft computer environment 200 comprises a flight computer 201. The flight computer 201 comprises various hardware components including one or more single or multi-core processors collectively represented by a processor 202, a graphics processing unit (GPU) 204, a solid-state drive 206, a random access memory 208, a display interface 214, and an input/output interface 212. The flight computer 201 may be an avionic computer specifically designed for installation into an aircraft. In some alternative embodiments, the flight computer 201 may be a generic computer system adapted to meet certain requirements, such as, but not limited to, certification requirements. As previously mentioned in the sections above, the flight computer 201 may be an "electronic device", a "controller", an "flight control computer", "a flight control system", a "flight computer", an "avionic computer", an "Engine-Indicating and Crew-Alerting System (EICAS)", a "server", a, "remote server", a "computer-based system" and/or any combination thereof appropriate to the relevant task at hand. Even though reference is made to a "flight computer", it should be understood that this aspect is not limitative and that the flight computer 201 does not need or require to control or contribute to control the aircraft to enable the present technology. In some embodiments, the flight computer 201 may also be a sub-system of one of the above-listed systems. In some other embodiments, the flight computer 201 may be an "off the shelf" generic computer system. In some embodiments, the flight computer 201 may also be distributed amongst multiple systems. The flight computer 201 may also be specifically dedicated to the implementation of the present technology. As a person in the art of the present technology may appreciate, multiple variations as to how the flight computer 201 is implemented may be envisioned without departing from the scope of the present technology.

Communication between the various components of the flight computer 201 may be enabled by one or more internal and/or external buses 210 (e.g. a PCI bus, universal serial bus, IEEE 1394 "Firewire" bus, SCSI bus, Serial-ATA bus, ARINC bus, etc.), to which the various hardware components are electronically coupled. A display interface 214 may be coupled to (e.g., via a cable or a bus) the first primary flight display 112, the second primary flight display 114, the first "Head-Up Display (HUD)" 108 and/or the second head up display 110. In some embodiments, the display interface 214 may be coupled to a display surface dedicated to the display of the single visual indication in accordance with the present technology.

The input/output interface 212 may be coupled to a touchscreen 216 and to the one or more internal and/or external buses 210. The touchscreen 216 may be part of the first primary flight display 112 and/or the second primary flight display 114 or may be part of a separate display. In the embodiments illustrated in FIG. 2, the touchscreen 216 comprises touch hardware 220 (e.g., pressure-sensitive cells embedded in a layer of a display allowing detection of a physical interaction between a user and the display) and a touch input/output controller 218 allowing communication with the display interface 214 and/or the one or more internal and/or external buses 210. In some embodiments, the input/output interface 212 may be connected to a keyboard (not shown), a mouse (not shown) or a trackpad (not shown) allowing the user to interact with the flight computer 201 in addition or in replacement of the touchscreen.

According to implementations of the present technology, the solid-state drive 206 stores program instructions suitable for being loaded into the random access memory 208 and executed by the processor 202 and/or the GPU 204 for processing activity indications associated with a user. For example, the program instructions may be part of a library or an application.

In the example of FIG. 2, the flight computer 201 may be in communication with multiple systems, such as, but not limited to, an aircraft engine controller (not shown) and a control panel (not shown). The flight computer 201 may also be connected to a fly-by-wire system and/or be part of a fly-by-wire architecture. In the illustrated embodiment, the flight computer 201 is configured so as to interact (for example, but without being limited to, via a wire or a wireless connection) with the first side stick 102, the second side stick 104, the first rudder pedals 116 and/or the second rudder pedals 118. In some embodiments, the flight computer 201 is configured so as to interact (for example, but without being limited to, via a wire or a wireless connection) with an autopilot system 150, data sensors 130 and/or flight surface controllers 140. In some embodiments, the autopilot 150 may generate an indication indicative of an aircraft control input and then transmit the generated indication to the flight computer 201 as if the aircraft control input has been generated by the first side stick 102, the second side stick 104, the first rudder pedals 116 and/or the second rudder pedals 118. In some embodiments, the data sensors 130 provide data relating to a condition of operation of the aircraft, such as, but not limited to, air speed, actual roll, pitch and/or yaw, etc. In some embodiments where the flight computer 201 allows control of the aircraft, the flight computer 201 may generate control commands based on one or more aircraft control inputs, data from the data sensors and control logic. The generated control commands may then be transmitted to the flight surface controllers 140 so to modify a position/orientation of one or more flight control surfaces.

In some embodiments, the flight computer 201 may be configured so as to receive a digital and/or analogic signal from at least one of the first side stick 102, the second side stick 104, the first rudder pedals 116, the second rudder pedals 118 and/or the autopilot and generate, based on the digital and/or analogic signal, an indication of an aircraft control input. In some embodiments, the aircraft control input may be determined based on only one of the digital and/or analogic signal received from the at least one of the first side stick 102, the second side stick 104, the first rudder pedals 116, the second rudder pedals 118 and/or the autopilot. For example, the flight computer 201 may determine which one of the first side stick 102, the second side stick 104, the first rudder pedals 116, the second rudder pedals 118 and/or the autopilot has priority and then generate the aircraft control input solely based on that signal. In some other embodiments, the flight computer 201 may generate the indication indicative of the aircraft control input based on a combination of two or more of the digital and/or analogic signals received from at least one of the first side stick 102, the second side stick 104, the first rudder pedals 116, the second rudder pedals 118 and/or the autopilot. In some embodiments, the indication indicative of the aircraft control input is solely generated based on the one or more signals received without taking into consideration data received from the data sensors or generated by control logics. As a result, the indication indicative of the aircraft control input may actually reflect the "real" or "actual" input made by the pilot and/or the co-pilot thereby allowing to capture what the pilot and/or co-pilot intended to input as an aircraft control input and not how a flight control computer interpreted the inputs to generate commands to flight surface controllers and/or how a position of the flight control surfaces is modified. This approach may allow to capture an aircraft control input based on which a single visual indication may be generated. Under such embodiments, the single visual indication may thereby accurately reflect the "real" or "actual" input made by the pilot and/or the co-pilot before it is interpreted or processed by the fly-by-wire system. Conversely, in some other embodiments, the indication indicative of the aircraft control input is generated based on the one or more signals received and data received from the data sensors or generated by control logics. In such embodiments, the indication indicative of the aircraft control input may reflect how a flight control computer interpreted the inputs to generate commands to flight surface controllers. Under such embodiments, the single visual indication may be based on the "real" or "actual" input made by the pilot and/or the co-pilot as well as additional data from the data sensors or generated by control logic. As a result, in such embodiments, the single visual indication may not be solely based on the "real" or "actual" input made by the pilot and/or the co-pilot before it is interpreted or processed by the fly-by-wire system.

Figure 3:
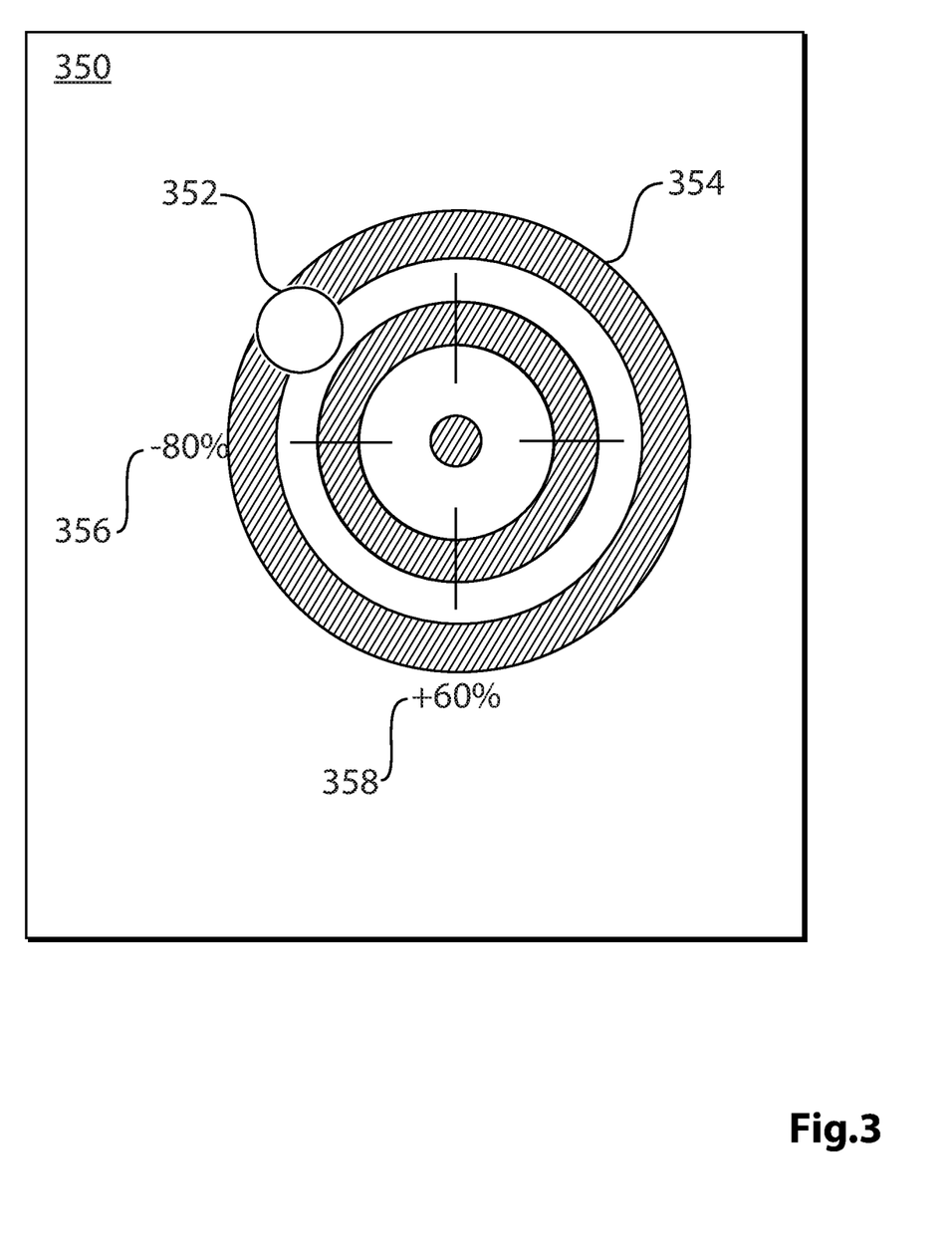
FIG. 3 is a diagram illustrating a display in accordance with an embodiment of the present technology.

Turning now to FIG. 3, a display 350 is shown. In some embodiments, the display 350 may be displayed on a display surface, such as one of the first head-up display 108, the second head-up display 110, the first primary flight display 112, the second primary flight display 114, the first EICAS display 120 and/or the second EICAS display 122 or a sub-portion thereof. In some embodiments, a same display 350 may be presented to a pilot on the first head-up display 108, the first primary flight display 112 and/or the first EICAS display 120 and to a co-pilot on the second head-up display 110, the second primary flight display 114 and/or the second EICAS display 122. In some embodiments, the display 350 may be presented to the pilot and/or the co-pilot in response to an event relating to the operation of the aircraft. As an example, the first primary flight display 112 may present standard information up until an event is detected. Upon detection of the event, the first primary flight display 112 may then display the display 350 either on an entirety of a display surface or on a portion of a display surface. As an example, the event may be a change in flight mode (e.g., from normal mode to direct mode), a dual input received from the first side stick 102 and the second side stick 104 (e.g., a first input from the first side stick 102 and a second input from the second side stick 104 inputted at a same time by the pilot and the co-pilot), a detection of the aircraft reaching flight envelope limits, etc. In some other embodiments, the display 350 may be manually activated by the pilot and/or the co-pilot. As a result, it should be understood that both a permanent display and a temporary display may be envisioned. In addition, in some embodiments, only specific graphical components may be permanently or temporarily displayed. For example, the target-like graphical component 354 may be permanently displayed while the single visual indication 352 may be temporally displayed, for example upon detection of an event such as on the events detailed above.

In the illustrated embodiment, the display 350 comprises a single visual indication 352, a target-like graphical component 354, a first quantitative value 356 and a second quantitative value 358.

As previously discussed, the single visual indication 352 may be embodied as a graphical icon and/or other forms of visual indicators which may or may not include alpha/numeric textual information. In the illustrated embodiment, the single visual indication 352 is a dot which may or may not be associated with a color code. In some embodiments, the color code may reflect an operating condition of the aircraft (e.g., turning from green to red when the aircraft is approaching its flight envelope limits, etc). As it can be understood from the illustration of FIG. 3, the single visual indication 352 represents both an orientation and an amplitude of the aircraft control input as a single graphical component. The single visual indication 352 is designed in a way which aims at reducing a cognitive effort required by the pilot and/or the co-pilot to interpret the orientation and the amplitude of the aircraft control input aircraft system. It should be appreciated that the shape, form and/or color of the single visual indication 352 may vary as long as it defines a single indicator. In some alternative embodiments, when a dual input is detected, a combination of both a first input and a second input may be taken into consideration to generate the single visual indication 352. In some other embodiments, when a dual input is detected a first single visual indication representing the first input (e.g., from the pilot) and a second single visual indication representing the second input (e.g., from the co-pilot) may be displayed simultaneously on the target-like graphical component 354. Multiple variations regarding how the single visual indication 352 is designed and how the single visual indication 352 is presented to the user may be envisioned without departing from the scope of the present technology.

The target-like graphical component 354 illustrated in FIG. 3 comprises multiple circular graphical patterns arranged so as to define a target-like pattern. The target-like pattern is designed so as to facilitate an interpretation of an orientation and amplitude of the aircraft control input represented by the single visual indication 352. In some embodiments, the target-like graphical component 354 also comprises reticles which may help identifying a position of a horizontal axis and a position of a vertical axis. In some embodiments, the orientation is associated with the horizontal axis and the vertical axis. In some embodiments, an amplitude is associated with a first distance of the single visual indication 352 to the horizontal axis and a second distance of the single visual indication 352 to the vertical axis. In some embodiments, the first distance and the second distance may be selected so that the single visual indication 352 reflects the position of the first side stick 102 or the second side stick 104, at a given time. In some other embodiments, the first distance and the second distance may be selected so that the single visual indication 352 reflects a combination of the positions of the first side stick 102 and the second side stick 104, a given time. This could be achieved, for example, by summing positions of the first side stick 102 and the second side stick 104.

The display 350 also comprises the first quantitative value 356 and the second quantitative value 358. The first quantitative value 356 may be associated with the horizontal axis. The second quantitative value 358 may be associated with the vertical axis. In some embodiments, the first quantitative value 356 may be reflective of an amplitude of the aircraft control input along a longitudinal axis. In some embodiments, the second quantitative value 358 may be reflective of an amplitude of the aircraft control input along a vertical axis. In some embodiments, the first quantitative value 356 and the second quantitative value 358 may reflect values of the aircraft control input provided to the flight computer 201. In the illustrated embodiment, the first quantitative value 356 and the second quantitative value 358 are represented as being relative values (e.g., a percentage of an amplitude with respect to a minimum value and/or a maximum value). In alternative embodiments, the first quantitative value 356 and the second quantitative value 358 may be absolute values, such as, but not limited to, absolute values based on a unit associated with a grid representing possible finite positions of the aircraft control input. In some embodiments, the first distance is proportional to the first quantitative value 356 and the second distance is proportional to the second quantitative value 358.

Figure 4:
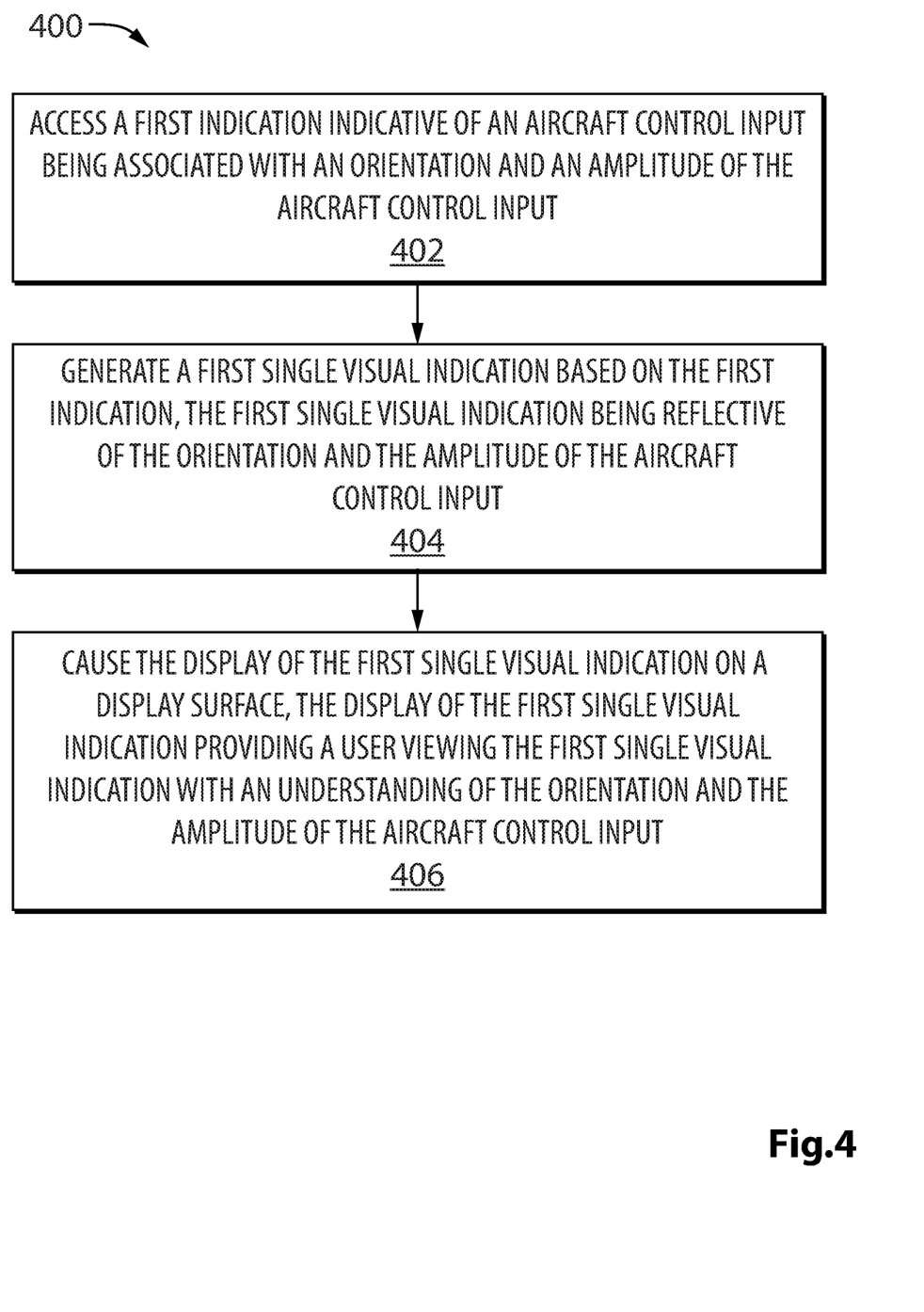
FIG. 4 is a diagram illustrating a first flowchart illustrating a computer-implemented method implementing embodiments of the present technology.
Figure 5:
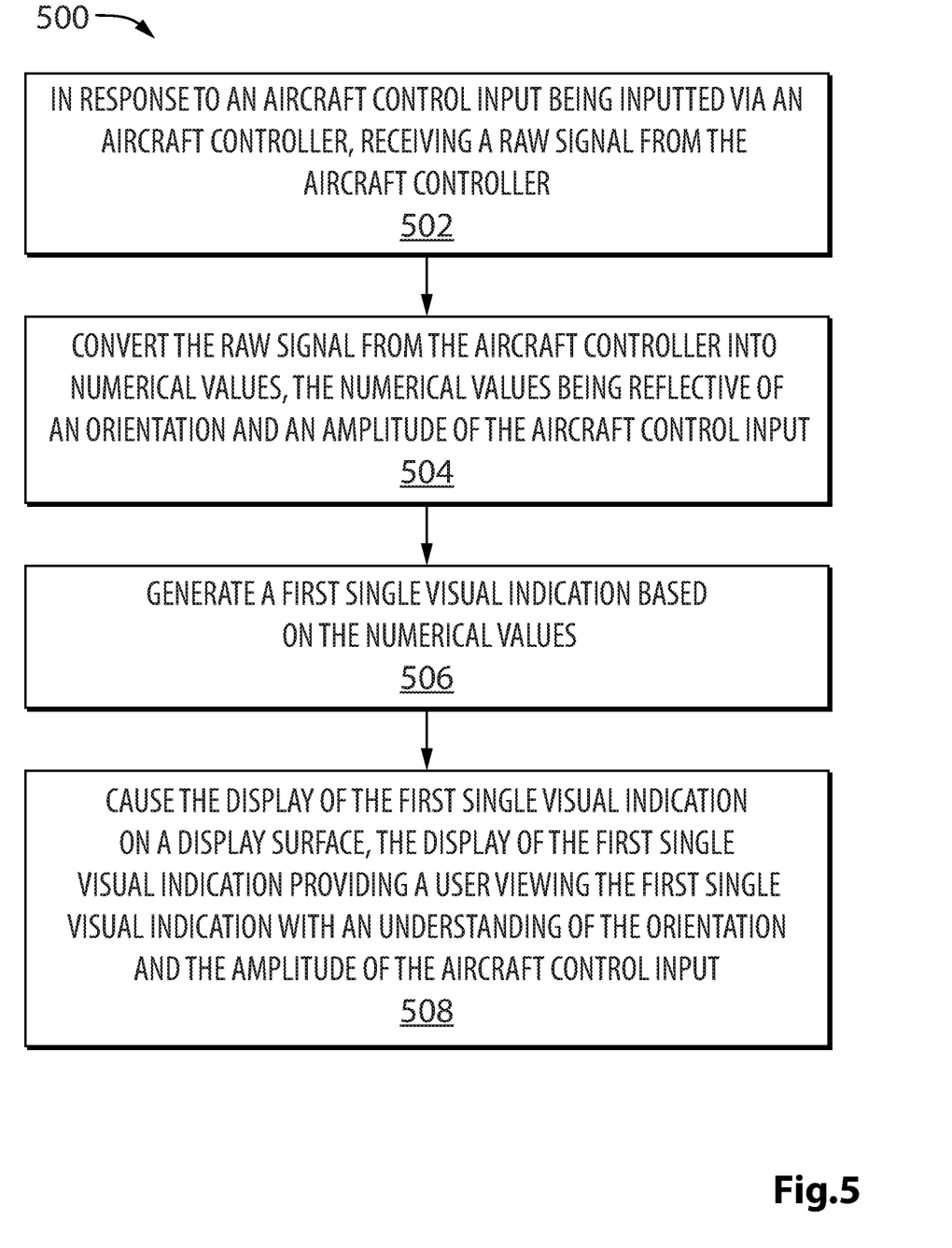
FIG. 5 is a diagram illustrating a second flowchart illustrating a computer-implemented method implementing embodiments of the present technology.

Having described, with reference to FIG. 1 to FIG. 3, some non-limiting example instances of systems and computer-implemented methods used in connection with the problem of displaying an aircraft control input, we shall now describe general solutions to the problem with reference to FIG. 4 to FIG. 5.

More specifically, FIG. 4 shows a flowchart illustrating a first computer-implemented method 400 of displaying an aircraft control input. In some embodiments, the aircraft control input is generated by an aircraft controller. In some embodiments, the aircraft controller is one of a side stick, a yoke, a rudder pedal and an autopilot. In some embodiments, the first computer-implemented method 400 may be (completely or partially) implemented on the flight computer system 201.

The method 400 starts at step 402 by accessing, from a non-transitory computer-readable medium, a first indication indicative of an aircraft control input, the aircraft control input being associated with an orientation and an amplitude of the aircraft control input. In some embodiments, the first indication indicative of the aircraft control input is a numerical value generated based on a raw digital signal of the aircraft controller.

Then, at step 404, the method 400 proceeds to generating, by a processing unit, a first single visual indication based on the first indication, the first single visual indication being reflective of the orientation and the amplitude of the aircraft control input.

At step 406, the method 400 proceeds to causing the display of the first single visual indication on a display surface, the display of the first single visual indication providing a user viewing the first single visual indication with an understanding of the orientation and the amplitude of the aircraft control input. In some embodiments, the first single visual indication is a dot and the display surface displays a target-like graphical component on which the dot is positioned, the target-like graphical component comprising circular graphical patterns such that the positioning of the dot in relation to the circular graphical pattern eases the understanding of the orientation and the amplitude. In some embodiments, causing the first single visual indication to be displayed comprises causing the first single visual indication to be displayed in relation to at least one of a graphical amplitude scale and a graphical orientation scale.

In some embodiments, the orientation is associated with (1) a first axis of the display surface and (2) a second axis of the display surface and the amplitude is associated with (3) a first distance of the first single visual indication to the first axis and (4) a second distance of the first single visual indication to the second axis. In some embodiments, a first quantitative value is associated with the first axis of the display surface and a second quantitative value is associated with the second axis, the first quantitative value being reflective of a first axis amplitude of the aircraft control input along a longitudinal axis and the second quantitative value being reflective of a second axis amplitude of the aircraft control input along a vertical axis. In some embodiments, the first quantitative value and the second quantitative value reflect values of the aircraft control input provided to a fly-by-wire system. In some embodiments, the first quantitative value and the second quantitative value are one of absolute values and relative values. In some embodiments, the first distance is proportional to the first quantitative value and the second distance is proportional to the second quantitative value. In some embodiments, the display surface is at least a part of a multi-function display, a primary flight display and a head-up display. In some embodiments, causing the display of the first single visual indication on the display surface is in response to an event relating to the operation of an aircraft. In some embodiments, causing the display of the first single visual indication on the display surface is in response to the event relating to the operation of an aircraft comprises temporarily displaying the first single visual indication on the display surface. In some embodiments, the event comprises at least one of a detection of a change in flight mode, a dual input received from a first aircraft controller and a second aircraft controller and a detection of a flight envelope limit.

Turning now to FIG. 5, there is shown a flowchart illustrating a second computer-implemented method 500 of displaying an aircraft control input. In some embodiments, the aircraft control input is generated by an aircraft controller. In some embodiments, the aircraft controller is one of a side stick, a yoke, a rudder pedal and an autopilot. In some embodiments, the second computer-implemented method 500 may be (completely or partially) implemented on the flight computer system 201. In some embodiments, the method 500 may include some or all of the features recited in connections to the description of the method 400.

The method 500 starts at step 502 by, in response to an aircraft control input being inputted via an aircraft controller, receiving a raw signal from the aircraft controller. Then at a step 504, the method 500 proceeds to converting, by a processing unit, the raw signal from the aircraft controller into numerical values, the numerical values being reflective of an orientation and an amplitude of the aircraft control input. At a step 506, the method 500 may proceed to generating, by the processing unit, a first single visual indication based on the numerical values. Then, at a step 508, the method 500 proceeds to causing the display of the first single visual indication on a display surface, the display of the first single visual indication providing a user viewing the first single visual indication with an understanding of the orientation and the amplitude of the aircraft control input.

While the above-described implementations have been described and shown with reference to particular steps performed in a particular order, it will be understood that these steps may be combined, sub-divided, or re-ordered without departing from the teachings of the present technology. The steps may be executed in parallel or in series. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for displaying an aircraft control input, the method comprising:
    accessing, from a non-transitory computer-readable medium, a first indication indicative of an aircraft control input, the aircraft control input being associated with an orientation and an amplitude of the aircraft control input;
    generating, by a processing unit, a first single visual indication based on the first indication, the first single visual indication being reflective of the orientation and the amplitude of the aircraft control input; and causing the display of the first single visual indication on a display surface, the display of the first single visual indication providing a user viewing the first single visual indication with an understanding of the orientation and the amplitude of the aircraft control input, wherein causing the display of the first single visual indication on the display surface is in response to an event relating to the operation of an aircraft, and wherein the event comprises a dual input received from a first aircraft controller and a second aircraft controller, wherein the first single visual indication comprises a dot and the display surface further displays a target-like graphical component, the target-like graphical component comprising circular graphical patterns, and wherein a first input from the first aircraft controller and a second input from the second aircraft controller are displayed simultaneously on the target-like graphical component.

2. The method of claim 1, wherein causing the first single visual indication to be displayed comprises causing the first single visual indication to be displayed in relation to at least one of a graphical amplitude scale and a graphical orientation scale.

3. The method of claim 1, wherein the target-like graphical component is configured to ease understanding of the orientation and the amplitude.

4. The method of claim 1, wherein the orientation is associated with (1) a first axis of the display surface and (2) a second axis of the display surface and the amplitude is associated with (3) a first distance of the first single visual indication to the first axis and (4) a second distance of the first single visual indication to the second axis.

5. The method of claim 4, wherein a first quantitative value is associated with the first axis of the display surface and a second quantitative value is associated with the second axis, the first quantitative value being reflective of a first axis amplitude of the aircraft control input along a longitudinal axis and the second quantitative value being reflective of a second axis amplitude of the aircraft control input along a vertical axis.

6. The method of claim 5, wherein the first quantitative value and the second quantitative value reflect values of the aircraft control input provided to a fly-by-wire system.

7. The method of claim 6, wherein the first quantitative value and the second quantitative value are one of absolute values and relative values.

8. The method of claim 6, wherein the first distance is proportional to the first quantitative value and the second distance is proportional to the second quantitative value.

9. The method of claim 1, wherein the aircraft control input is generated by the first aircraft controller.

10. The method of claim 9, wherein the first aircraft controller is one of a side stick, a yoke, a rudder pedal and an autopilot.

11. The method of claim 9, wherein the first indication indicative of the aircraft control input is a numerical value generated based on a raw digital signal of the first aircraft controller.

12. The method of claim 1, wherein the display surface is at least a part of a multifunction display, a primary flight display and a head-up display.

13. The method of claim 1, wherein causing the display of the first single visual indication on the display surface in response to the event relating to the operation of an aircraft comprises temporarily displaying the first single visual indication on the display surface.

14. A computer-implemented method for displaying an aircraft control input, the method comprising:

in response to an aircraft control input being inputted via a first aircraft controller, receiving a raw signal from the first aircraft controller;

converting, by a processing unit, the raw signal from the first aircraft controller into numerical values, the numerical values being reflective of an orientation and an amplitude of the aircraft control input;

generating, by the processing unit, a first single visual indication based on the numerical values; and causing the display of the first single visual indication on a display surface, the display of the first single visual indication providing a user viewing the first single visual indication with an understanding of the orientation and the amplitude of the aircraft control input, wherein causing the display of the first single visual indication on the display surface is in response to an event relating to the operation of an aircraft, and wherein the event comprises a dual input received from the first aircraft controller and a second aircraft controller, wherein the first single visual indication comprises a dot and the display surface further displays a target-like graphical component, the target-like graphical component comprising circular graphical patterns, and wherein a first input from the first aircraft controller and a second input from the second aircraft controller are displayed simultaneously on the target-like graphical component.

15. A computer-implemented system for displaying an aircraft control input, the system comprising:

a non-transitory computer-readable medium;

a processor configured to perform:

accessing, from the non-transitory computer-readable medium, a first indication indicative of an aircraft control input, the aircraft control input being associated with an orientation and an amplitude of the aircraft control input;

generating, by the processor, a first single visual indication based on the first indication, the first single visual indication being reflective of the orientation and the amplitude of the aircraft control input; and causing the display of the first single visual indication on a display surface, the display of the first single visual indication providing a user viewing the first single visual indication with an understanding of the orientation and the amplitude of the aircraft control input, wherein causing the display of the first single visual indication on the display surface is in response to an event relating to the operation of an aircraft, and wherein the event comprises a dual input received from a first aircraft controller and a second aircraft controller, wherein the first single visual indication comprises a dot and the display surface further displays a target-like graphical component, the target-like graphical component comprising circular graphical patterns, and wherein a first input from the first aircraft controller and a second input from the second aircraft controller are displayed simultaneously on the target-like graphical component.

16. The system of claim 15, wherein causing the first single visual indication to be displayed comprises causing the first single visual indication to be displayed in relation to at least one of a graphical amplitude scale and a graphical orientation scale.

17. The system of claim 15, wherein the first single visual indication is configured to ease the understanding of the orientation and the amplitude.

18. The system of claim 15, wherein the orientation is associated with (1) a first axis of the display surface and (2) a second axis of the display surface and the amplitude is associated with (3) a first distance of the first single visual indication to the first axis and (4) a second distance of the first single visual indication to the second axis.

19. The system of claim 18, wherein a first quantitative value is associated with the first axis of the display surface and a second quantitative value is associated with the second axis, the first quantitative value being reflective of a first axis amplitude of the aircraft control input along a longitudinal axis and the second quantitative value being reflective of a second axis amplitude of the aircraft control input along a vertical axis.

20. The system of claim 19, wherein the first quantitative value and the second quantitative value reflect values of the aircraft control input provided to a fly-by-wire system.

21. The system of claim 20, wherein the first quantitative value and the second quantitative value are one of absolute values and relative values.

22. The system of claim 19, wherein the first distance is proportional to the first quantitative value and the second distance is proportional to the second quantitative value.

23. The system of claim 15, wherein the aircraft control input is generated by the first aircraft controller.

24. The system of claim 23, wherein the first aircraft controller is one of a side stick, a yoke, a rudder pedal and an autopilot.

25. The system of claim 23, wherein the first indication indicative of the aircraft control input is a numerical value generated based on a raw digital signal of the first aircraft controller.

26. The system of claim 15, wherein the display surface is at least a part of a multi-function display, a primary flight display and a head-up display.

27. The system of claim 15, wherein causing the display of the first single visual indication on the display surface in response to the event relating to the operation of an aircraft comprises temporarily displaying the first single visual indication on the display surface.

28. A computer-implemented system for displaying an aircraft control input, the system comprising:

a non-transitory computer-readable medium;

a processor configured to perform:

in response to an aircraft control input being inputted via a first aircraft controller, receiving a raw signal from the first aircraft controller;

converting, by the processor, the raw signal from the first aircraft controller into numerical values, the numerical values being reflective of an orientation and an amplitude of the aircraft control input;

generating, by the processor, a first single visual indication based on the numerical values; and causing the display of the first single visual indication on a display surface, the display of the first single visual indication providing a user viewing the first single visual indication with an understanding of the orientation and the amplitude of the aircraft control input, wherein causing the display of the first single visual indication on the display surface is in response to an event relating to the operation of an aircraft, and wherein the event comprises a dual input received from the first aircraft controller and a second aircraft controller, wherein the first single visual indication comprises a dot and the display surface further displays a target-like graphical component, the target-like graphical component comprising circular graphical patterns, and wherein a first input from the first aircraft controller and a second input from the second aircraft controller are displayed simultaneously on the target-like graphical component.

* * * * *